US008243165B2

(12) United States Patent
Fujiwara et al.

(10) Patent No.: US 8,243,165 B2

(45) Date of Patent: Aug. 14, 2012

(54) VIDEO CAMERA WITH FLICKER PREVENTION

(75) Inventors: Takeshi Fujiwara, Osaka (JP); Kazuhiro Tsujino, Osaka (JP); Kohei Fukugawa, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 275 days.

(21) Appl. No.: 12/612,447

(22) Filed: Nov. 4, 2009

(65) Prior Publication Data

US 2010/0141791 A1 Jun. 10, 2010

(30) Foreign Application Priority Data

Nov. 6, 2008 (JP) ................................ 2008-285732

(51) Int. Cl.
*H04N 5/243* (2006.01)

(52) U.S. Cl. .................................................... 348/228.1

(58) Field of Classification Search ............... 348/226.1, 348/228.1
See application file for complete search history.

(56) References Cited

U.S. PATENT DOCUMENTS 6,710,818 B1 * 3/2004 Kasahara et al. .......... 348/226.1
7,034,870 B2 * 4/2006 Nagaoka et al. ........... 348/228.1
2002/0154225 A1 * 10/2002 Matsumoto et al. ....... 348/229.1
2005/0024503 A1 * 2/2005 Baer et al. .................. 348/226.1
2006/0061669 A1 * 3/2006 Jang et al. .................. 348/226.1
2007/0146500 A1 * 6/2007 Lee et al. .................. 348/226.1
2007/0263101 A1 * 11/2007 Cho et al. .................. 348/226.1

FOREIGN PATENT DOCUMENTS

JP 09-284634 A 10/1997
JP 10-222124 A 8/1998
JP 11-252446 A 9/1999
JP 2001-016508 A 1/2001
JP 2001-111887 A 4/2001
JP 2003-18458 A 1/2003
JP 2005-311972 A 11/2005
JP 2007-194741 A 8/2007
JP 2007329658 A * 12/2007

* cited by examiner

*Primary Examiner* — Jason Whipkey
(74) *Attorney, Agent, or Firm* — Westerman, Hattori, Daniels & Adrian, LLP

(57) ABSTRACT

A video camera includes an image sensor. The image sensor repeatedly outputs an object scene image produced on an imaging surface having a plurality of pixels lined up in a vertical direction. A driver repeatedly executes an exposing operation for exposing the imaging surface for each pixel lined up in a vertical direction. A CPU repeatedly detects a plurality of luminance values respectively corresponding to a plurality of flicker evaluation areas allocated to the imaging surface in a manner to be located at positions different from one another in a vertical direction, based on the object scene image outputted from the image sensor. Moreover, the CPU determines the presence or absence of a flicker based on the plurality of luminance values thus detected.

8 Claims, 15 Drawing Sheets

10

MEMORY CONTROL 32
SDRAM 34
LCD DRIVER 38
LCD MONITOR 40
POST-PROCESS 36
I/F 42
RECORDING MEDIUM 44
12 14 16
CH1 CH2 CH3 CH4
PRE-PROCESS 22
FLASH MEMORY 46
DRIVER 18
SG 20
AE/AWB EVALUATION 24
FLICKER EVALUATION 26
AF EVALUATION 28
CPU 30t 30
KEY INPUT DEVICE 48

30t

| L | FLICKER EVALUATION VALUE FLK_L | | ΔFLK_L |
|---|---|---|---|
| | PRECEDING FRAME (K=0) | CURRENT FRAME (K=1) | |
| 0 | | | |
| 1 | | | |
| 2 | | | |
| 3 | | | |
| ⋮ | ⋮ | ⋮ | ⋮ |
| 15 | | | |

(A) FREQUENCY OF POWER SOURCE=60Hz (B) FREQUENCY OF POWER SOURCE=50Hz (A) FREQUENCY OF POWER SOURCE=60Hz (B) EXPOSURE TIME PERIOD=1/120sec: FLICKER AVOIDED (C) EXPOSURE TIME PERIOD=1/100sec: FLICKER OCCURRED (A) FREQUENCY OF POWER SOURCE=50Hz (B) EXPOSURE TIME PERIOD=1/120sec: FLICKER OCCURRED (C) EXPOSURE TIME PERIOD=1/100sec: FLICKER AVOIDED (A) FLICKER: OCCURRED (B) FLICKER: AVOIDED

FIG.17

EVA

FEV_0
FEV_1
FEV_2
FEV_3
FEV_4
FEV_5
FEV_6
FEV_7
FEV_8
FEV_9
FEV_10
FEV_11
FEV_12
FEV_13
FEV_14
FEV_15

VIDEO CAMERA WITH FLICKER PREVENTION

CROSS REFERENCE OF RELATED APPLICATION

The disclosure of Japanese Patent Application No. 2008-285732, which was filed on Nov. 6, 2008, is incorporated herein by reference.

BACKGROUND OF THE INVENTION

1. Field of the Invention

The present invention relates to a video camera. More particularly, the present invention relates to a video camera which prevents a generation of a flicker resulting from a beat interference between an exposure time period of an imaging device and a blinking cycle of a fluorescent lamp.

2. Description of the Related Art

According to one example of this type of a video camera, a level of a photographing signal outputted from an imaging portion is acquired for each field by a signal-level detecting device. A flicker detecting portion determines whether or not the acquired level has a fluctuation resulting from a flicker, and modifies a shutter speed when a determination result is affirmative. Thereby, it becomes possible to eliminate an adverse effect on an autofocus operation of the flicker.

However, in the above-described video camera, the level of the imaging signal is acquired for each field, and thus, it needs a plurality of field periods for determining whether or not the fluctuation resulting from the flicker occurs. Moreover, when it is intended to shorten the time period for determining the flicker, the accuracy for determination is deteriorated.

SUMMARY OF THE INVENTION

A video camera according to the present invention, comprises: an imager which repeatedly outputs an object scene image produced on an imaging surface having M (M: an integer of at least two) pixels lined up in a predetermined direction; an exposer which repeatedly executes an exposing operation for exposing the imaging surface for each N (N: an integer of at least one and less than M) pixels lined up in the predetermined direction; a detector which repeatedly detects a plurality of luminance values respectively corresponding to a plurality of flicker evaluation areas allocated to the imaging surface in a manner to be located at positions different from one another in the predetermined direction, based on the object scene image outputted from the imager; and a determiner which determines presence or absence of a flicker based on the plurality of luminance values repeatedly detected by the detector.

Preferably, the imager outputs the object scene image for each first period, and the exposer exposes the M pixels lined up in the predetermined direction in a second period shorter than the first period.

Preferably, the predetermined direction is equivalent to a direction which intersects a flicker streak appearing in the object scene image outputted from the imager.

More preferably, further comprised is an adjuster which adjusts an exposure time period of the imaging surface by referring to a determination result of the determiner.

Preferably, the determiner includes: a selector which selects each of the plurality of luminance values along the predetermined direction; a first measurer which measures the number of times with which a luminance selected this time by the selector exceeds a luminance selected last time by the selector; and a second measurer which measures the number of times with which the luminance selected this time by the selector is equal to or less than the luminance selected last time by the selector.

Preferably, the plurality of flicker evaluation areas have the same shape and size as one another.

According to the present invention, an imaging control program product executed by a processor of a video camera provided with: an imager which repeatedly outputs an object scene image produced on an imaging surface having M (M: an integer of at least two) pixels lined up in a predetermined direction; and an exposer which repeatedly executes an exposing operation for exposing the imaging surface for each N (N: an integer of at least one and less than M) pixels lined up in the predetermined direction, the imaging control program product, comprising: a detecting step of repeatedly detecting a plurality of luminance values respectively corresponding to a plurality of flicker evaluation areas allocated to the imaging surface in a manner to be located at positions different from one another in the predetermined direction, based on the object scene image outputted from the imager; and a determining step of determining presence or absence of a flicker based on the plurality of luminance values repeatedly detected in the detecting step.

According to the present invention, an imaging controlling method executed by a video camera provided with: an imager which repeatedly outputs an object scene image produced on an imaging surface having M (M: an integer of at least two) pixels lined up in a predetermined direction; and an exposer which repeatedly executes an exposing operation for exposing the imaging surface for each N (N: an integer of at least one and less than M) pixels lined up in the predetermined direction, the imaging controlling method, comprising: a detecting step of repeatedly detecting a plurality of luminance values respectively corresponding to a plurality of flicker evaluation areas allotted to the imaging surface in a manner to be located at positions different from one another in the predetermined direction, based on the object scene image outputted from the imager; and a determining step of determining presence or absence of a flicker based on the plurality of luminance values repeatedly detected in the detecting step.

The above described features and advantages of the present invention will become more apparent from the following detailed description of the embodiment when taken in conjunction with the accompanying drawings.

BRIEF DESCRIPTION OF THE DRAWINGS

FIG. 17 is an illustrative view showing one example of a plurality of flicker evaluation areas allocated to the evaluation area in another embodiment.

DETAILED DESCRIPTION OF THE PREFERRED EMBODIMENTS

Figure 1:
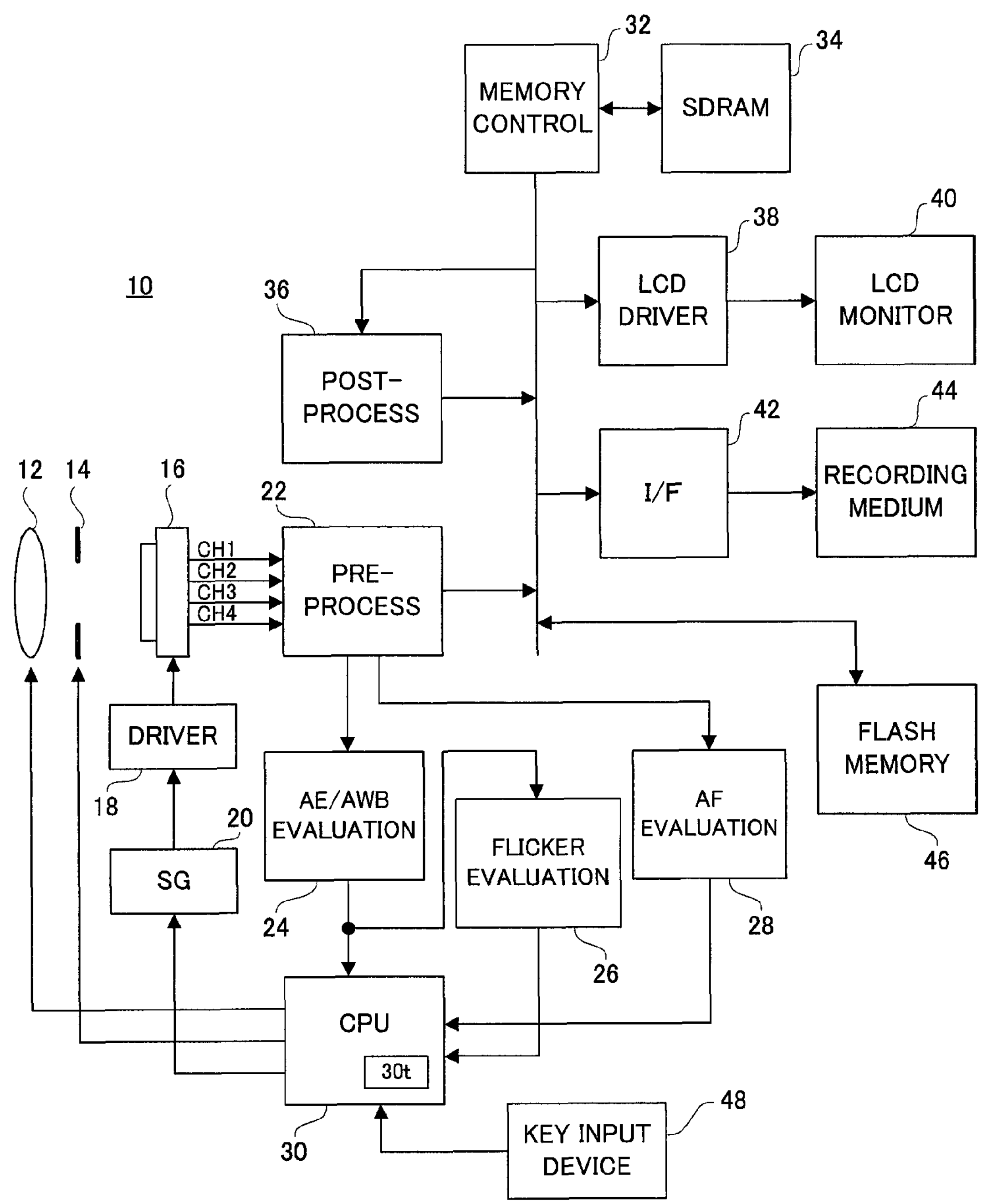
FIG. 1 is a block diagram showing a configuration of one embodiment of the present invention.

With reference to FIG. 1, a digital video camera 10 according to this embodiment includes a focus lens 12 and an aperture unit 14. An optical image of an object scene is irradiated onto an imaging surface of a CMOS-type image sensor 16 through these members. The imaging surface has an effective image area equivalent to horizontal 1440 pixels×vertical 1080 pixels, for example, and is covered with a primary color filter (not shown) having a Bayer array. Therefore, in each pixel, electric charges having any one of color information, i.e., R (Red), G (Green), and B (Blue), are produced by photoelectric conversion.

When a power supply is inputted, a CPU 30 starts-up a driver 18 in order to execute a through-image process. In response to a vertical synchronization signal Vsync generated at every 1/30 seconds from an SG (Signal Generator) 20, the driver 18 exposes the imaging surface by each line according to a focal-plane electronic shutter system, and reads out the electric charges produced on the imaging surface in a raster scanning manner. An exposure time period for each line is equal to or less than 1/30 seconds, raw image data representing an object scene is outputted from the image sensor 16 at a frame rate of 30 fps.

Figure 2:
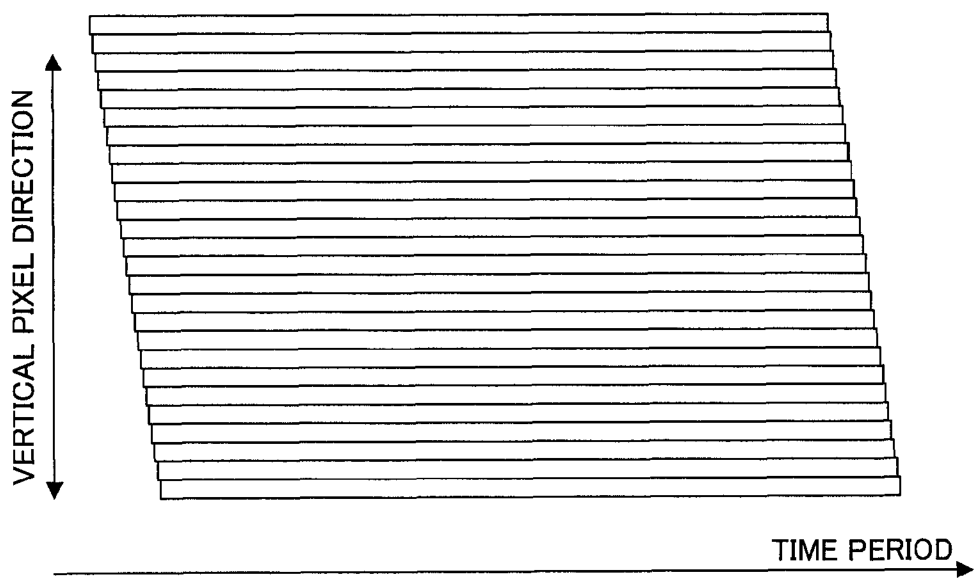
FIG. 2 is an illustrative view showing one example of a reading-out operation of electric charges produced on an imaging surface.

Because an exposing operation according to the focal-plane electronic shutter system is adopted, an exposure timing differs depending on each horizontal pixel column (=line), as roughly shown in FIG. 2. Also, the raw image data is divided into four fields in a vertical direction, and four fields of the divided raw image data are outputted from channels CH1 to CH4, respectively.

As described in detail later, one portion of the raw image data corresponding to a pixel in a (4N+1)th column is equivalent to one field of the raw image data outputted from the channel CH1, and one portion of the raw image data corresponding to a pixel in a (4N+2)th column is equivalent to one field of the raw image data outputted from the channel CH2. Furthermore, one portion of the raw image data corresponding to a pixel in a (4N+3)th column is equivalent to one field of the raw image data outputted from the channel CH3, and one portion of the raw image data corresponding to a pixel in a (4N+4)th column is equivalent to one field of the raw image data outputted from the channel CH4.

A pre-processing circuit 22 performs various processes such as a digital clamp, a pixel-defect correction, and gain control, on the raw image data thus outputted from the image sensor 16, and writes the processed raw image data into an SDRAM 34 through a memory control circuit 32.

A post-processing circuit 36 reads out the raw image data accommodated in the SDRAM 34 through the memory control circuit 32 at every 1/30 seconds, and performs various processes such as a color separation, a white balance adjustment, a YUV conversion, and a vertical zoom, on the read-out raw image data. As a result, image data corresponding to a YUV format is created at every 1/30 seconds. The created image data is written into the SDRAM 34 through the memory control circuit 32.

An LCD driver 38 repeatedly reads out the image data accommodated in the SDRAM 34, and drives an LCD monitor 40 based on the read-out image data. As a result, a real-time moving image (through image) representing the object scene is displayed on a monitor screen.

The pre-processing circuit 22 executes a simple RGB producing process and a simple Y producing process in addition to the above-described processes. The raw image data is converted into RGB data (data in which each pixel has all color information of R, G, and B) by a simple RGB converting process, and converted into Y data by a simple Y converting process. The RGB data produced by the simple RGB converting process is applied to an AE/AWB evaluating circuit 24, and the Y data produced by the simple Y converting process is applied to an AF evaluating circuit 28.

Figure 3:
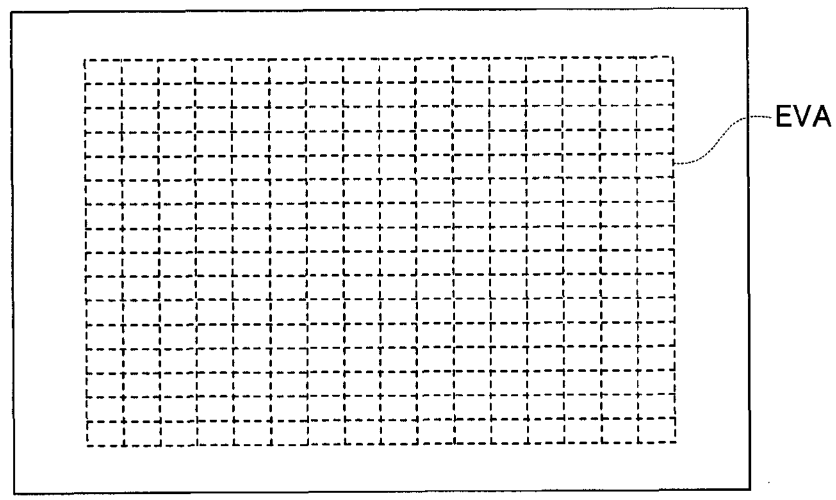
FIG. 3 is an illustrative view showing one example of an evaluation area allocated to the imaging surface.

With reference to FIG. 3, an evaluation area EVA is allocated to a center of the imaging surface. The evaluation area EVA is divided into 16 portions in each of a horizontal direction and a vertical direction, and thus, a total of 256 partial evaluation areas are distributed on the evaluation area EVA.

Figures 4, 5:
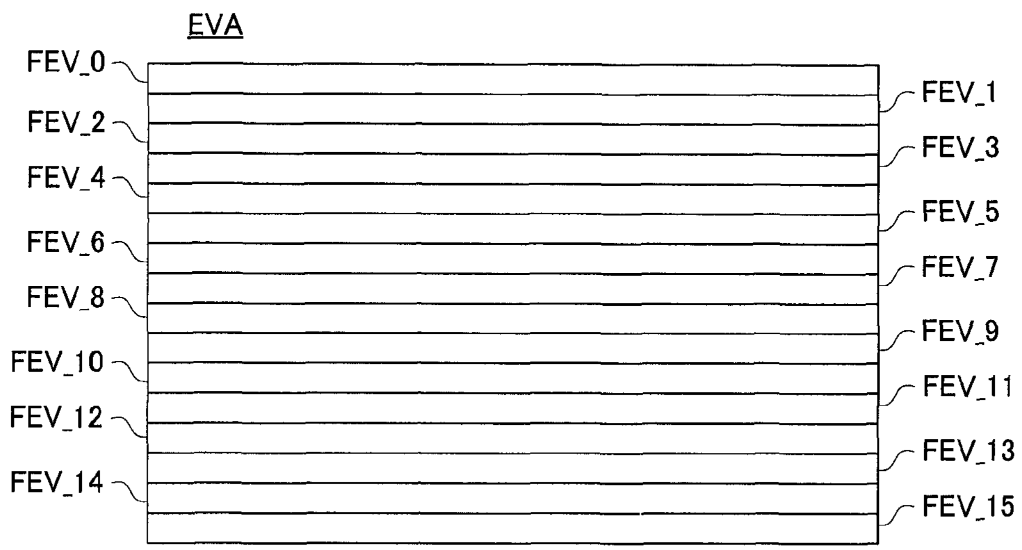
FIG. 4 is an illustrative view showing one example of a plurality of flicker evaluation areas allocated to the evaluation area.
FIG. 5 is an illustrative view showing one example of a table applied to the embodiment of FIG. 1.

The evaluation area EVA is further divided into 16 flicker evaluation areas FEV_0 to FEV_15 in a vertical direction, as shown in FIG. 4. The flicker evaluation areas FEV_0 to FEV_15 have the same shape and size as one another, and are distributed in a vertical direction at positions different from one another.

The AE/AWB evaluating circuit 24 integrates RGB data belonging to the 256 partial evaluation areas, out of the RGB data produced by the pre-processing circuit 22, at each generation of the vertical synchronization signal Vsync. Thereby, 256 integral values, i.e., 256 AE/AWB evaluation values, are outputted from the AE/AWB evaluating circuit 24 in response to the vertical synchronization signal Vsync.

Moreover, the AF evaluating circuit 28 extracts a high frequency component of the Y data belonging to the 256 partial evaluation areas, out of the Y data outputted from the pre-processing circuit 22, and integrates the extracted high frequency component at each generation of the vertical synchronization signal Vsync. Thereby, 256 integral values, i.e., 256 AF evaluation values, are outputted from the AF evaluating circuit 28 in response to the vertical synchronization signal Vsync.

Moreover, a flicker evaluating circuit 26 accumulates 256 AE/AWB evaluation values outputted from the AE/AWB evaluating circuit 24 corresponding to each of the flicker evaluation areas FEV_0 to FEV_15. Thereby, 16 integral values, i.e., 16 flicker evaluation values FLK_0 to FLK_15, are outputted from the flicker evaluating circuit 26 in response to the vertical synchronization signal Vsync.

The CPU 30 repeatedly fetches the AE/AWB evaluation values from the AE/AWB evaluating circuit 24 under an AE/AWB task, and calculates an appropriate EV value and a white balance adjustment-use appropriate gain based on the fetched AE/AWB evaluation values. Moreover, the CPU 30 sets the aperture amount and the exposure time period that define the calculated appropriate EV value to the aperture unit 14 and the driver 18, respectively, and sets the calculated white balance adjustment-use appropriate gain to the post-processing circuit 36. As a result, a brightness and a white balance of the moving image outputted from the LCD monitor 40 are moderately adjusted.

Moreover, the CPU 30 repeatedly fetches the AF evaluation value from the AF evaluating circuit 28 under a continuous AF task, and executes an AF process when the fetched AF evaluation value satisfies an AF start-up condition. The AF start-up condition is satisfied when a fluctuation amount of the fetched AF evaluation value exceeds a threshold value, and by using the AF process executed thereby, a focus lens 12 is placed at a focal point Furthermore, under a flicker countermeasure task, the CPU 30 fetches the flicker evaluation values FLK_0 to FLK_15 from the flicker evaluating circuit 24 so as to determine whether or not a flicker resulting from a difference between the exposure time period of the image sensor 16 and a blinking cycle of a light source occurs based on the fetched flicker evaluation values FLK_0 to FLK_15. Then, when the flicker does not occur, the CPU 30 sets a flag FLGflk to "0" while the flicker occurs, sets the flag FLGflk to "1". The CPU 30 refers to a state of the flag FLGflk under the AE/AWB task, and adjusts the exposure time period to a length that is an integral multiple of the blinking cycle of the light source. Thereby, the flicker is dissolved.

When a recording start manipulation is performed by a key input device 48, an I/F 42 is started-up by the CPU 30. The I/F 42 reads out the image data accommodated in the SDRAM 34 at every 1/30 seconds, and writes the read-out image data in a moving image file within a recording medium 44 in a compressed state. The I/F 42 is stopped by the CPU 30 when a recording end manipulation is performed on the key input device 48. As a result, a recording process of the image data is ended.

Figure 6:
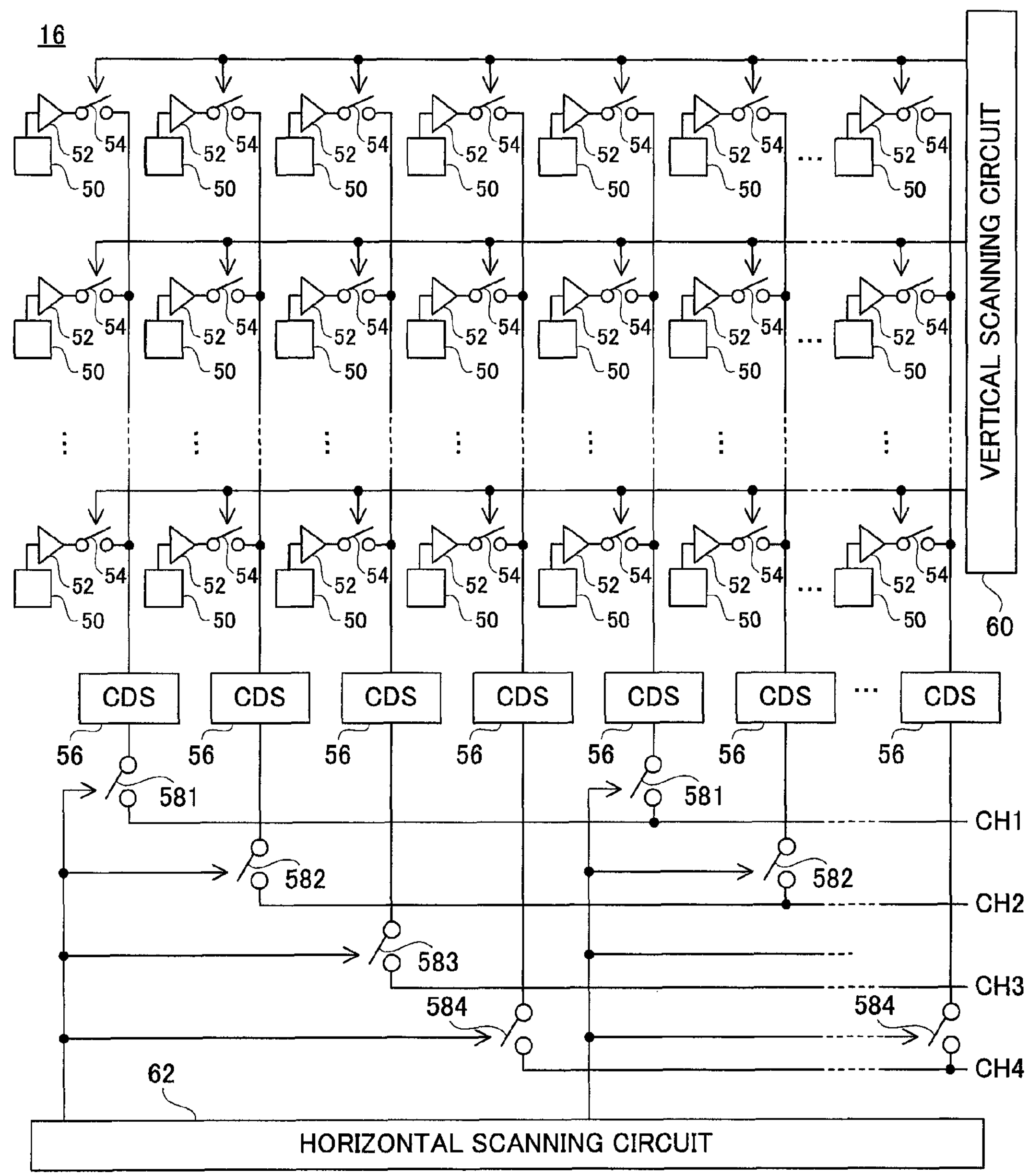
FIG. 6 is a block diagram showing one example of a configuration of an imaging device applied to the embodiment in FIG. 1.

The image sensor 16 is configured as shown in FIG. 6. The electric charges representing the object scene image are produced by a plurality of light-receiving elements 50, 50, . . . , placed in a matrix. Each light-receiving element 50 is equivalent to the above-described pixel. Each of light-receiving elements 50, 50, . . . , lined up in a vertical direction is connected to a common CDS circuit 56 via an A/D converter 52 and a row selecting switch 54. The electric charge produced in the light-receiving element 50 is converted into 12-bit digital data by the A/D converter 52. A vertical scanning circuit 60 executes an operation for turning on/off each of the row selecting switches 54, 54, . . . , for each pixel, in a raster scanning manner. Noise included in the pixel data that has undergone the row selecting switch 54 in an on state is removed by the CDS circuit 56.

A column selecting switch 581 is allocated to a CDS circuit 56 in a (4N+1)th (N: 0, 1, 2, 3, . . . ) column, a column selecting switch 582 is allocated to a CDS circuit 56 in a (4N+2)th column, a column selecting switch 583 is allocated to a CDS circuit 56 in a (4N+3)th column, and a column selecting switch 584 is allocated to a CDS circuit 56 in a (4N+4)th column A horizontal scanning circuit 62 turns on the column selecting switch 581 at a timing at which the row selecting switch 54 in a (4N+1)th column is turned on, turns on the column selecting switch 582 at a timing at which the row selecting switch 54 in a (4N+2)th column is turned on, turns on the column selecting switch 583 at a timing at which the row selecting switch 54 in a (4N+3)th column is turned on, and turns on the column selecting switch 584 at a timing at which the row selecting switch 54 in a (4N+4)th column is turned on.

As a result, the partial raw image data based on the electric charge produced in the light-receiving element 50 in the (4N+1)th column is outputted from the channel CH1, and the partial raw image data based on the electric charge produced in the light-receiving element 50 in the (4N+2)th column is outputted from the channel CH2. Also, the partial raw image data based on the electric charge produced in the light-receiving element 50 in the (4N+3)th column is outputted from the channel CH3, and the partial raw image data based on the electric charge produced in the light-receiving element 50 in the (4N+4)th column is outputted from the channel CH4.

Figure 7:
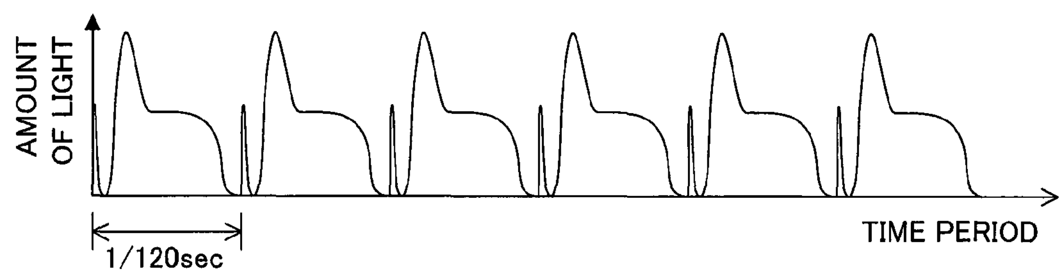
FIG. 7(A) is an illustrative view showing one example of a blinking state of a fluorescent lamp driven by a commercially available power source of 60 Hz.
FIG. 7(B) is an illustrative view showing one example of a blinking state of a fluorescent lamp driven by a commercially available power source of 50 Hz.
Figure 7:
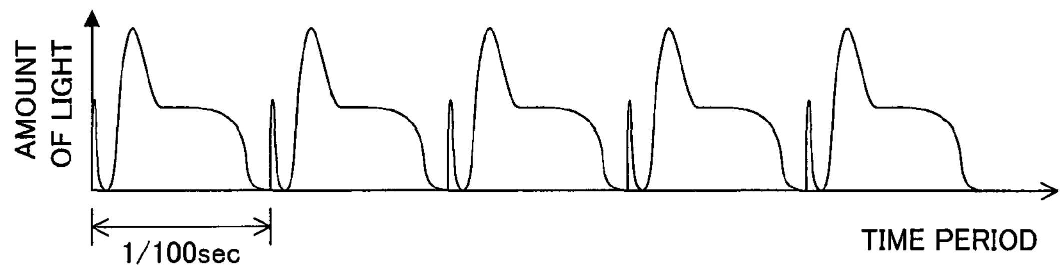

A fluorescent lamp driven by a commercially available power source of 60 Hz blinks as shown in FIG. 7(A), and a fluorescent lamp driven by a commercially available power source of 50 Hz blinks as shown in FIG. 7(B). On the other hand, because the image sensor 16 adopts the focal-plane electronic shutter system, the exposure timing differs depending on each horizontal pixel column.

Figure 8:
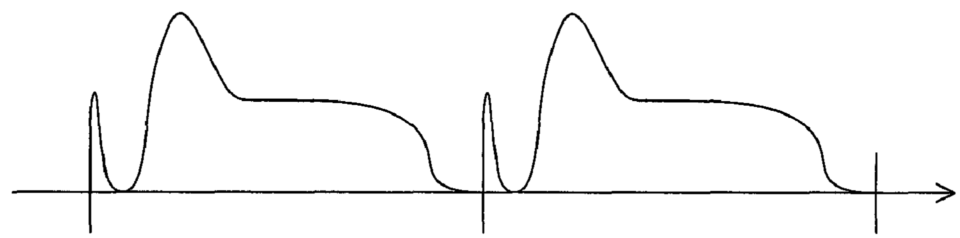
FIG. 8(A) is an illustrative view showing one example of a blinking state of a fluorescent lamp driven by a commercially available power source of 60 Hz.
FIG. 8(B) is an illustrative view showing one example of a reading-out operation of electric charges produced on the imaging surface.
FIG. 8(C) is an illustrative view showing another example of the reading-out operation of electric charges produced on the imaging surface.
Figure 8:
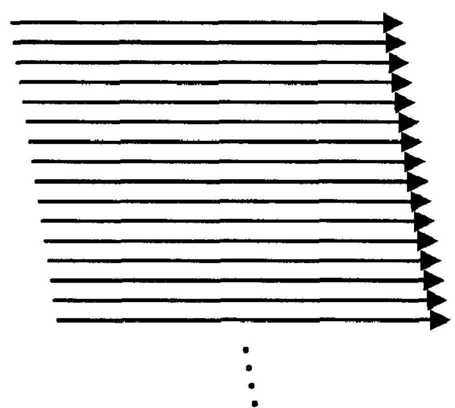
Figure 8:
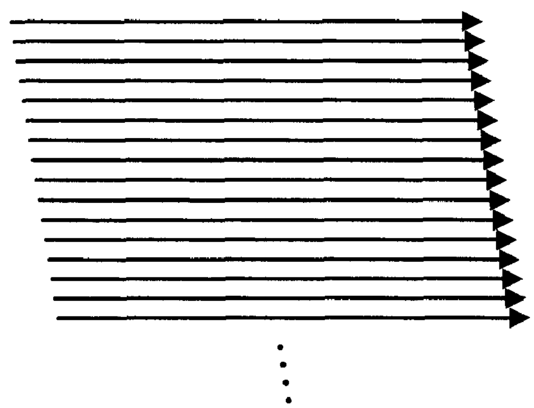

As a result, under a light source that blinks in a cycle equivalent to 60 Hz, flicker is generated when the exposure time period is set to a value that is an integral multiple of 1/100 seconds, and on the other hand, when the exposure time period is set to a value that is an integral multiple of 1/120 seconds, the generation of flicker is avoided (see FIG. 8(A) to FIG. 8(C)).

Figure 9:
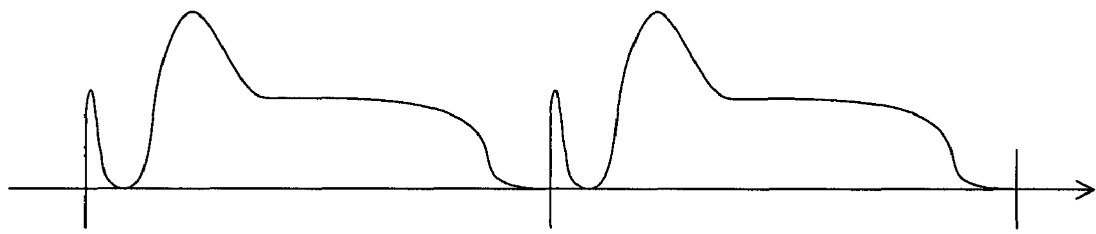
FIG. 9(A) is an illustrative view showing one example of a blinking state of a fluorescent lamp driven by a commercially available power source of 50 Hz.
FIG. 9(B) is an illustrative view showing one example of a reading-out operation of electric charges produced on the imaging surface.
FIG. 9(C) is an illustrative view showing another example of the reading-out operation of electric charges produced on the imaging surface.
Figure 9:
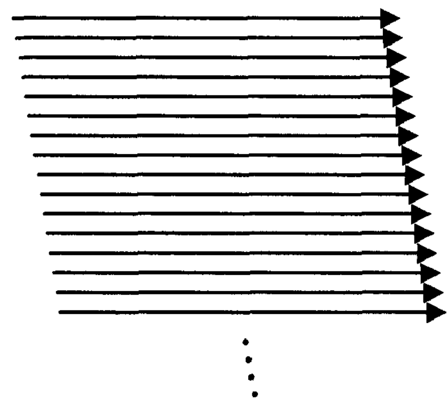
Figure 9:
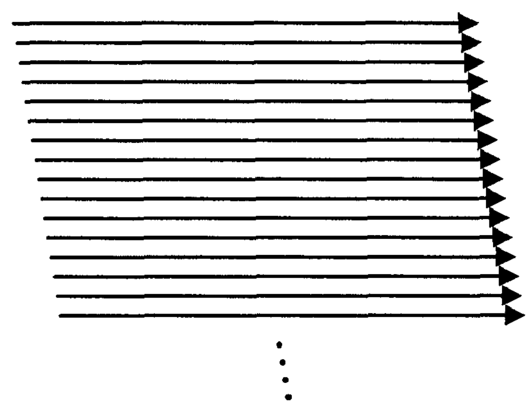

In contrary, under a light source that blinks in a cycle equivalent to 50 Hz, the flicker is generated when the exposure time period is set to a value that is an integral multiple of 1/120 seconds, and on the other hand, when the exposure time period is set to a value that is an integral multiple of 1/100 seconds, the generation of flicker is avoided (see FIG. 9(A) to FIG. 9(C)).

Therefore, the CPU 30 sets the flag FLGflk to "0" under an assumption that firstly, the object scene is not influenced by the light source that blinks in a cycle equivalent to 50 Hz, under the above-described AE/AWB task Upon setting the above-described appropriate EV value, the CPU 30 further adjusts the exposure time period to a time period that is an integral multiple of 1/120 seconds, and also adjusts the aperture amount to an amount that defines the appropriate EV value by working in cooperation with such an exposure time period.

Moreover, the CPU 30 determines, under the flicker countermeasure task in parallel with the AE/AWB task, whether or not a fluctuation between frames of the flicker evaluation values FLK_0 to FLK_15 outputted from the flicker evaluating circuit 26 is equivalent to the flicker.

Specifically, firstly, the flicker evaluation values FLK_0 to FLK_15 obtained in a preceding frame and the flicker evaluation values FLK_0 to FLK_15 obtained in a current frame are written in a table 30*t* shown in FIG. 5, and a difference value between frames of the flicker evaluation values FLK_0 to FLK_15 is calculated as ΔFLK_0 to ΔFLK_15. The calculated difference values ΔFLK_0 to ΔFLK_15 are written in the same table 30*t*.

Subsequently, a fluctuation tendency of the difference values ΔFLK_0 to ΔFLK_15 on a table 30*t* is analyzed. When the difference values ΔFLK_0 to ΔFLK_15 partially indicate an increasing tendency in a vertical direction, a flag FLGinc is set to "1". Moreover, when the difference values ΔFLK_0 to ΔFLK_15 partially indicate a decreasing tendency in a vertical direction, a flag FLGdec is set to "1".

Upon completion of the analysis of such a fluctuation tendency, the FLGflk is set to "0" or "1" by referring to states of the flags FLGinc and FLGdec. That is, when both the flags FLGinc and FLGdec indicate "1", then, this is regarded that the flicker occurs, and thus, the flag FLGflk is set to "1". On the other hand, when at least one of the flags FLGinc and FLGdec indicates "0", then, this is regarded that the flicker does not occur, and thus, the flag FLGflk is set to "0".

Figure 10:
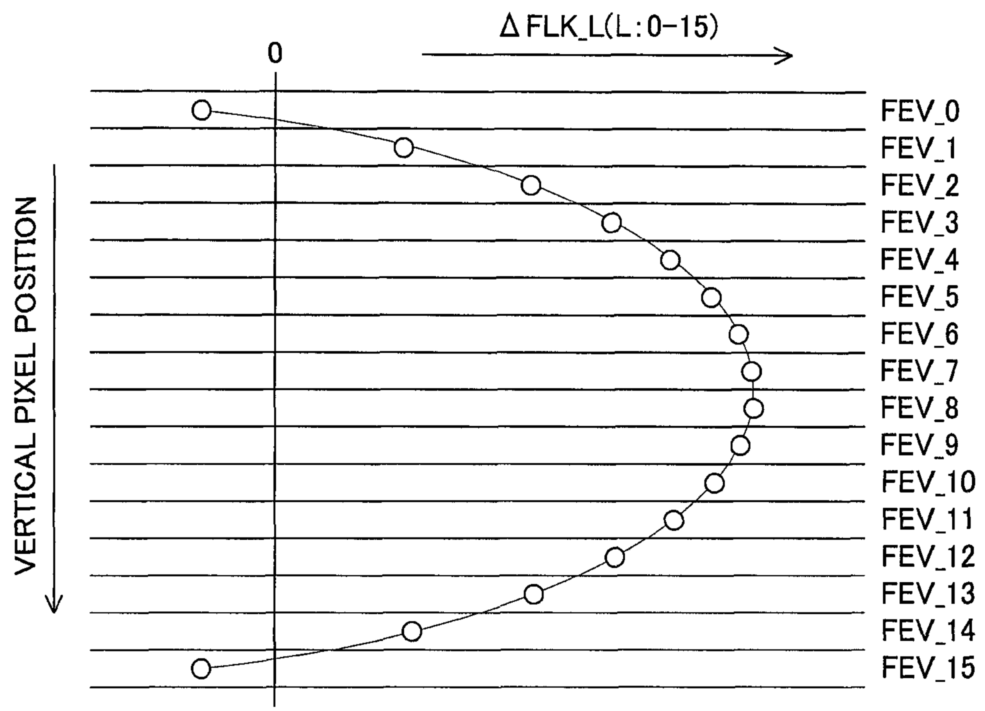
FIG. 10(A) is an illustrative view showing one example of a distribution of a plurality of luminance difference values respectively corresponding to a plurality of flicker evaluation areas.
FIG. 10(B) is an illustrative view showing another example of a distribution of a plurality of luminance difference values respectively corresponding to a plurality of flicker evaluation areas.
Figure 10:
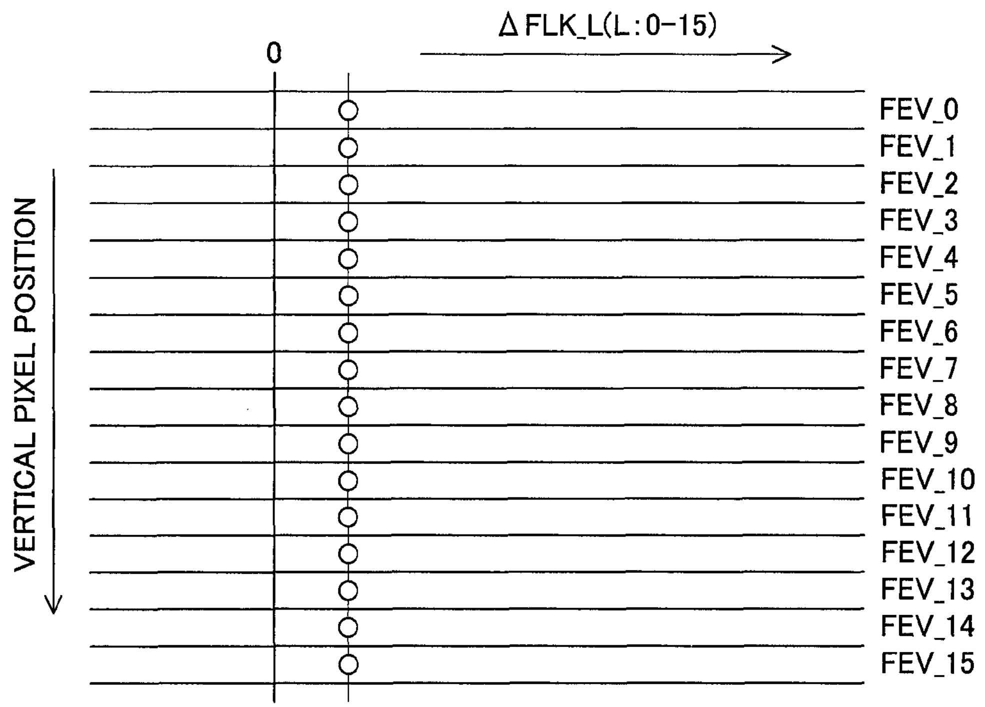

When the object scene is placed under the light source that blinks in a cycle equivalent to 50 Hz, the flicker evaluation values FLK_0 to FLK_15, resulting from the flicker, are fluctuated as shown in FIG. 10(A). As a result, both the flags FLGinc and FLGdec are set to "1, and also, the flag FLGflk is set to "1".

In the AE/AWB task after the flag FLGflk is modified to "1", the exposure time period is adjusted to a time period that is an integral multiple of 1/100 seconds, and the aperture amount is adjusted to an amount that defines the appropriate EV value by working in cooperation with such an exposure time period. As a result of the exposure time period being adjusted to the time period that is an integral multiple of 1/100 seconds, the flicker is dissolved.

The difference values ΔFLK_0 to ΔFLK_15 calculated under the flicker countermeasure task after the flicker is dissolved have a characteristic as shown in FIG. 10(B). At this time, the flags FLGinc and FLGdec are both set to "0", and thereby, the flag FLGflk is also set to "0". The exposure time period adjusted under the AE/AWB task maintains the time period that is an integral multiple of 1/100 seconds.

Figure 11:
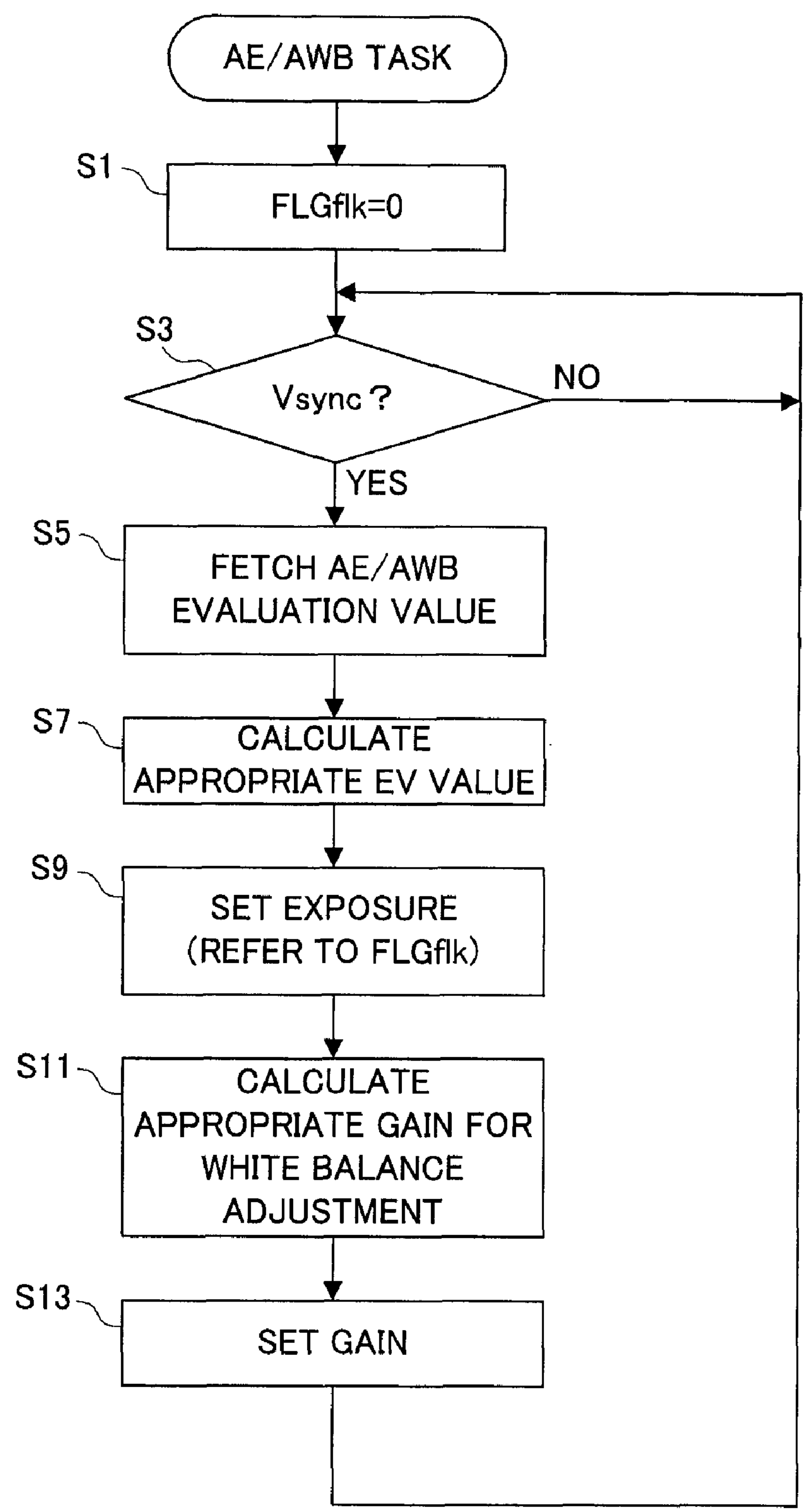
FIG. 11 is a flowchart showing one portion of an operation of a CPU applied to the embodiment in FIG. 1.
Figure 12:
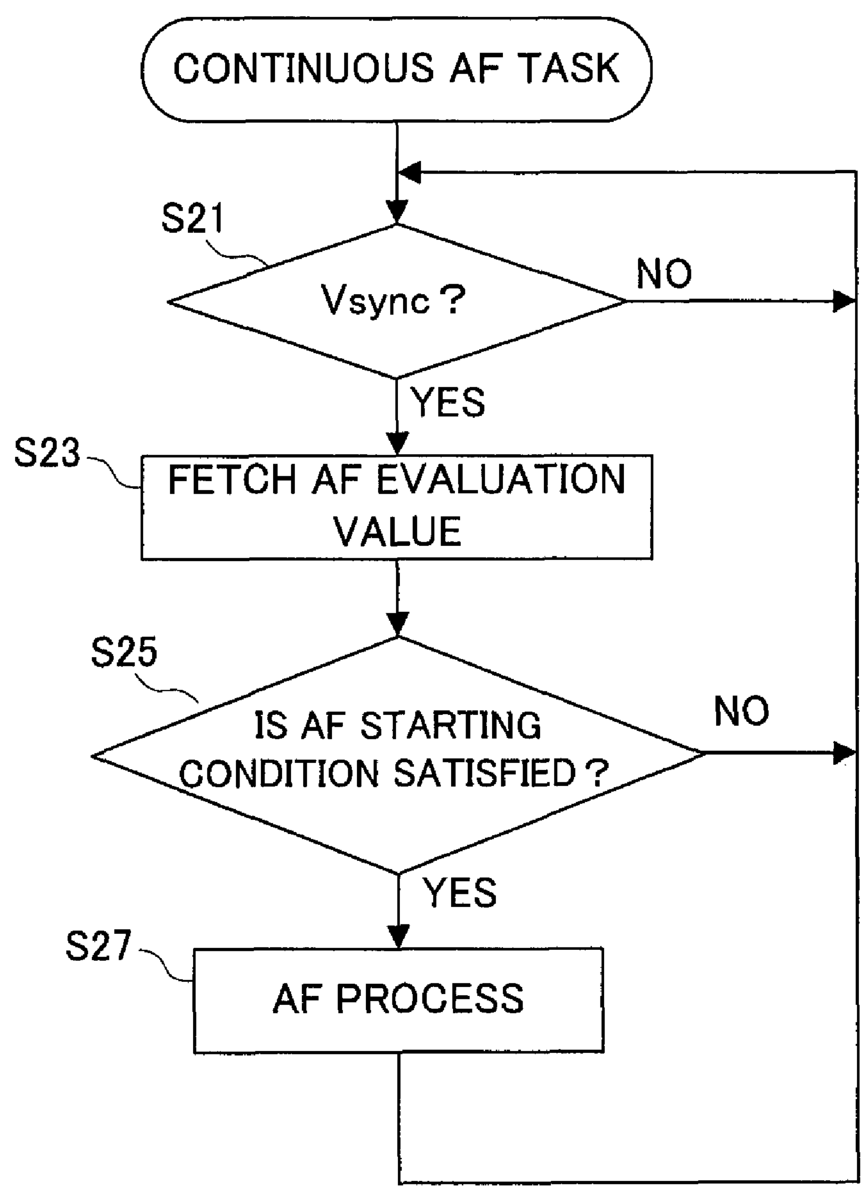
FIG. 12 is a flowchart showing another portion of the operation of the CPU applied to the embodiment in FIG. 1.

The CPU 30 executes a plurality of tasks in parallel, including an AE/AWB task shown in FIG. 11, a continuous AF task shown in FIG. 12, and a flicker countermeasure task shown in FIG. 13 to FIG. 16. It is noted that control programs corresponding to these tasks are stored in a flash memory 46.

Firstly, with reference to FIG. 11, the flag FLGflk is set to "0" in a step S1. As described above, the flag FLGflk is a flag used for identifying whether or not the object scene is influenced by the light source that blinks in a cycle equivalent to 50 Hz, and "0" indicates that the object scene is not under influence of such a light source while "1" indicates that the object scene is under influence of such a light source. As a result of the process in the step S1, it is provisionally declared that the object scene is not influenced by the light source that blinks in a cycle equivalent to 50 Hz.

When the vertical synchronization signal Vsync is generated, YES is determined in a step S3, and the AE/AWB evaluation value is fetched from the AE/AWB evaluating circuit 24 in a step S5. In a step S7, based on the fetched AE/AWB evaluation value, the appropriate EV value is calculated.

In a step S9, the aperture amount and the exposure time period that define the appropriate EV value calculated in the step S7 are determined, and the determined aperture amount and exposure time period are set to the aperture unit 14 and the driver 18, respectively. Upon adjusting the aperture amount and the exposure time period, the flag FLGflk is referred to.

That is, when the flag FLGflk indicates "0", it is determined that the object scene is not under influence of the light source of 50 Hz, and an exposure time period indicating a value that is an integral multiple of 1/120 seconds and an aperture amount that defines the appropriate EV value by working in cooperation with this exposure time period are calculated. On the other hand, when the flag FLGflk indicates "1", it is determined that the object scene is under influence of the light source of 50 Hz, and an exposure time period indicating a value that is an integral multiple of 1/100 seconds and an aperture amount that defines the appropriate EV value by working in cooperation with this exposure time period are calculated.

In a step S11, based on the AE/AWB evaluation value fetched in the step S5, the white balance adjustment-use appropriate gain is calculated. In a step S13, the calculated appropriate gain is set to the post-processing circuit 36, and upon completion of the setting process, the process returns to the step S3.

With reference to FIG. 12, it is determined in a step S21 whether or not the vertical synchronization signal Vsync is generated, and if YES is determined, the AF evaluation value is fetched from the AF evaluating circuit 28 in a step S23. In a step S25, whether or not the AF start-up condition is satisfied is determined based on the fetched AF evaluation value, and if NO is determined, the process directly returns to the step S21 while if YES is determined, the AF process is executed in a step S27, and then, the process returns to the step S21. As a result of the process in the step S27, the focus lens 12 is placed at the focal point.

Figure 13:
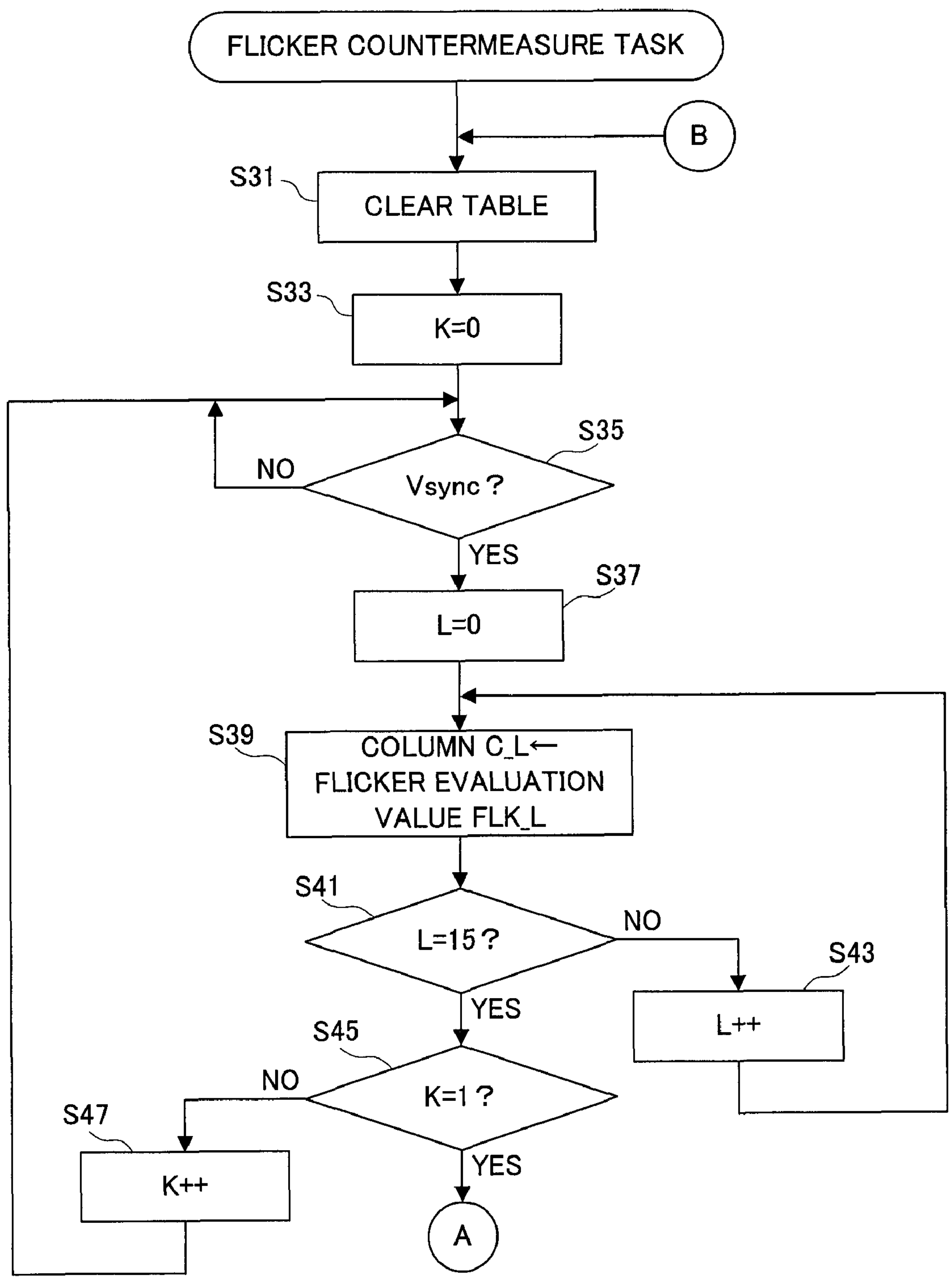
FIG. 13 is a flowchart showing still another portion of the operation of the CPU applied to the embodiment in FIG. 1.

With reference to FIG. 13, the table 30*t* is cleared in a step S31, and in a step S33, a variable K is set to "0". When the vertical synchronization signal Vsync is generated, YES is determined in a step S35, and a variable L is set to "0" in a step S37. In a step S39, a flicker evaluation value FLK_L is written in a column C_L of the table 30*t* corresponding to the variable K. In a step S41, it is determined whether or not the variable L reaches "15", and in a step S43, it is determined whether or not the variable K is "1".

When NO is determined in the step S41, the variable L is incremented in the step S43, and then, the process returns to the step S39. When YES is determined in the step S41 while when NO is determined in a step S47, the process increments the variable K in the step S47, and then, returns to the step S35. When YES is determined in both the step S41 and a step S45, the process advances to a step S49.

Therefore, the processes in the steps S37 to S43 are executed twice to correspond to the continuous two frames. Thereby, the flicker evaluation values FLK_0 to FLK_15 corresponding to the preceding frame and the flicker evaluation values FLK_0 to FLK_15 corresponding to the current frame are written in the table 30*t*.

In a step S49, the variable L is set to "0", and in a step S51, the difference value ΔFLK_L equivalent to the difference between the flicker evaluation value FLK_L in the preceding frame and the flicker evaluation value FLK_L in the current frame is calculated. In a step S53, the calculated difference value ΔFLK_L is written in the column C_L of the table 30*t*. In a step S55, it is determined whether or not the variable L reaches "15", and when NO is determined, the process increments the variable L in a step S57, and then, returns to the step S51. However, when YES is determined, the process advances to a step S59. Therefore, processes in and after the step S59 are executed after the difference values ΔFLK_0 to ΔFLK_15 are written in the table 30*t*.

In the step S59, a manner of a change in difference values ΔFLK_0 to ΔFLK_15 is analyzed, and each of the flags FLGinc and FLGdec is set to "0" or "1". In a step S61, it is determined whether or not both the flags FLGinc and FLGdec indicate "1". When YES is determined, the flag FLGflk is set to "1" in a step S63, and when NO is determined, the flag FLGflk is set to "0" in a step S65. Upon completion of the process in the step S63 or S65, the process stands by for a predetermined time period (several seconds to several tens of seconds) in a step S67, and then, the process returns to the step S31.

Figure 14:
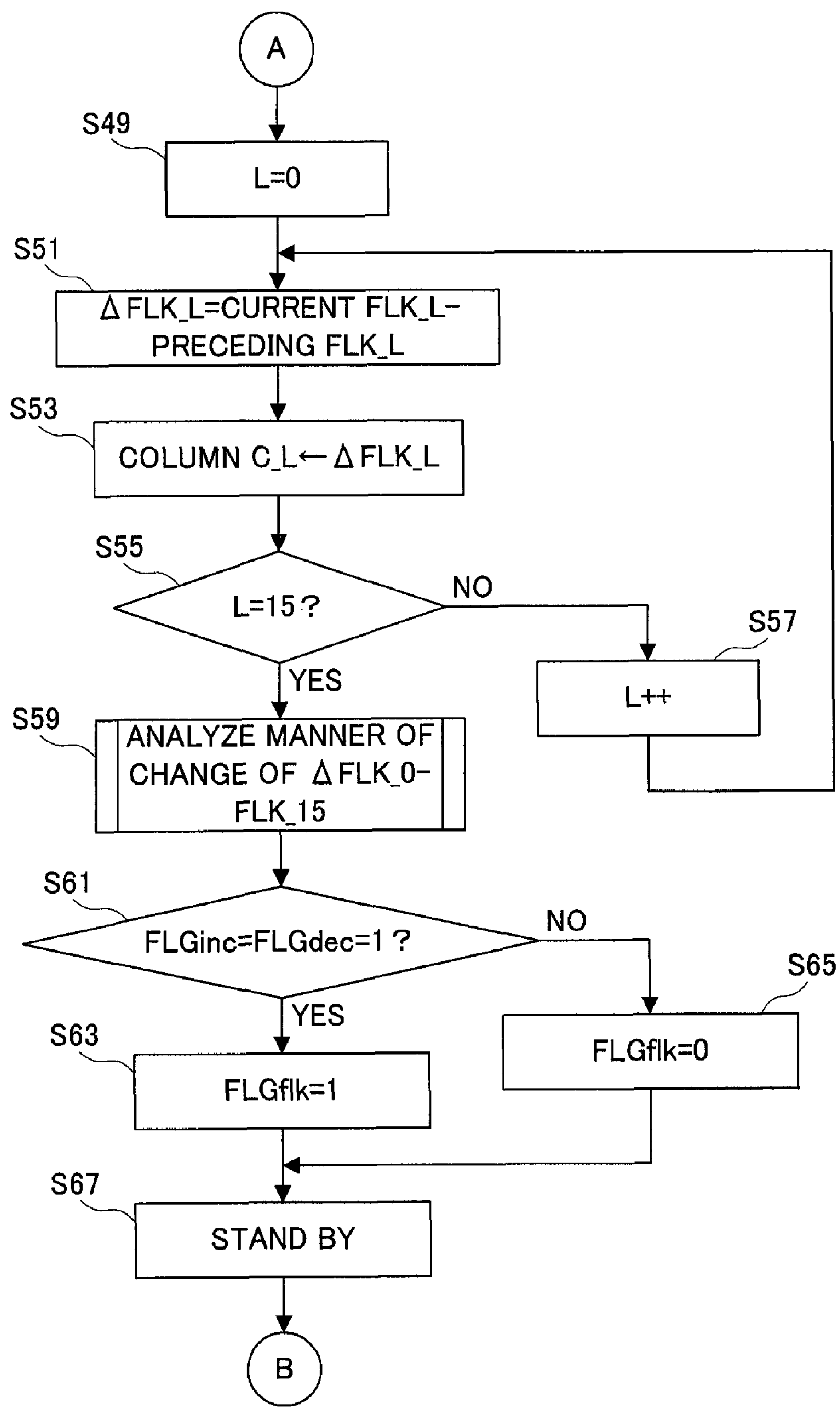
FIG. 14 is a flowchart showing yet still another portion of the operation of the CPU applied to the embodiment in FIG. 1.
Figure 15:
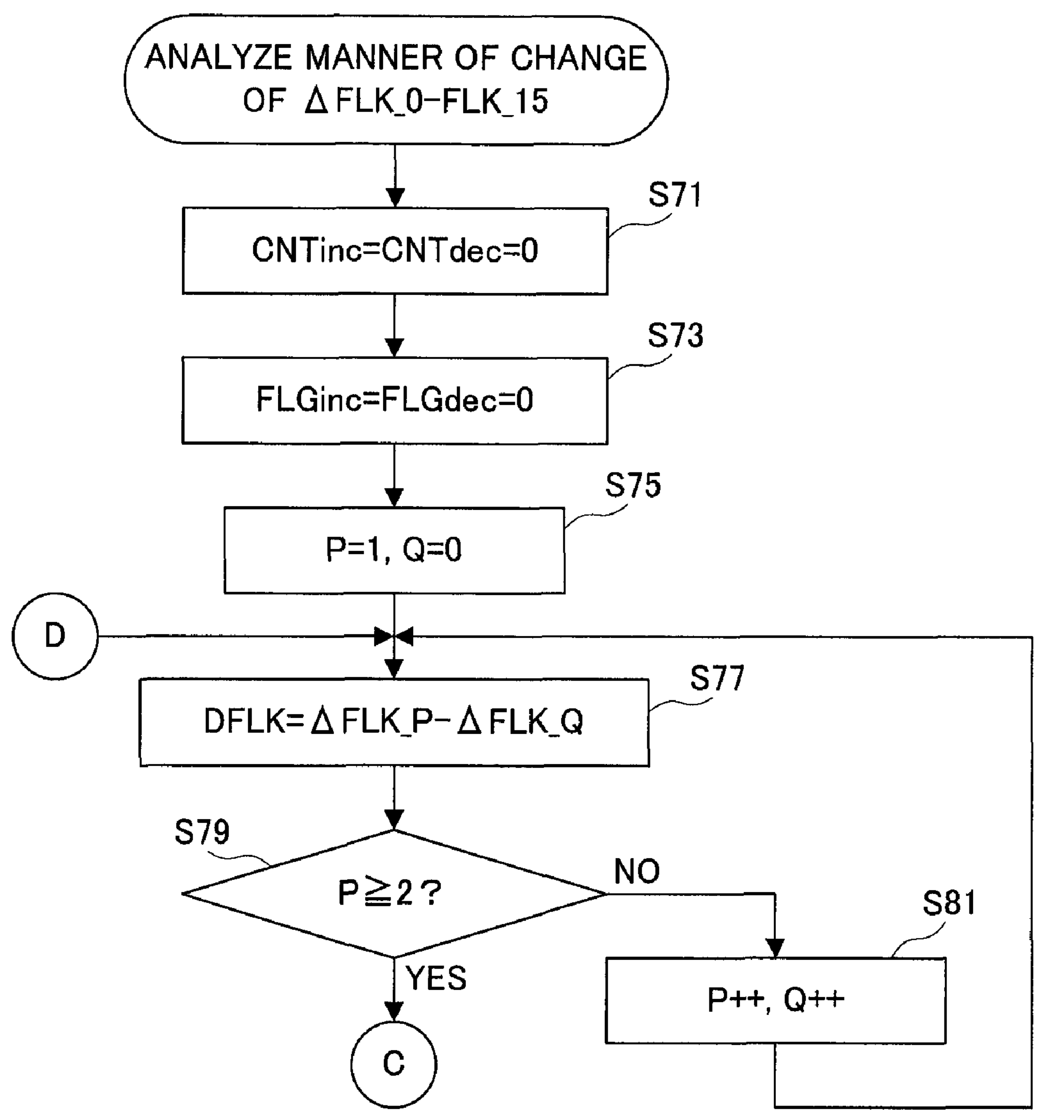
FIG. 15 is a flowchart showing another portion of the operation of the CPU applied to the embodiment in FIG. 1.
Figure 16:
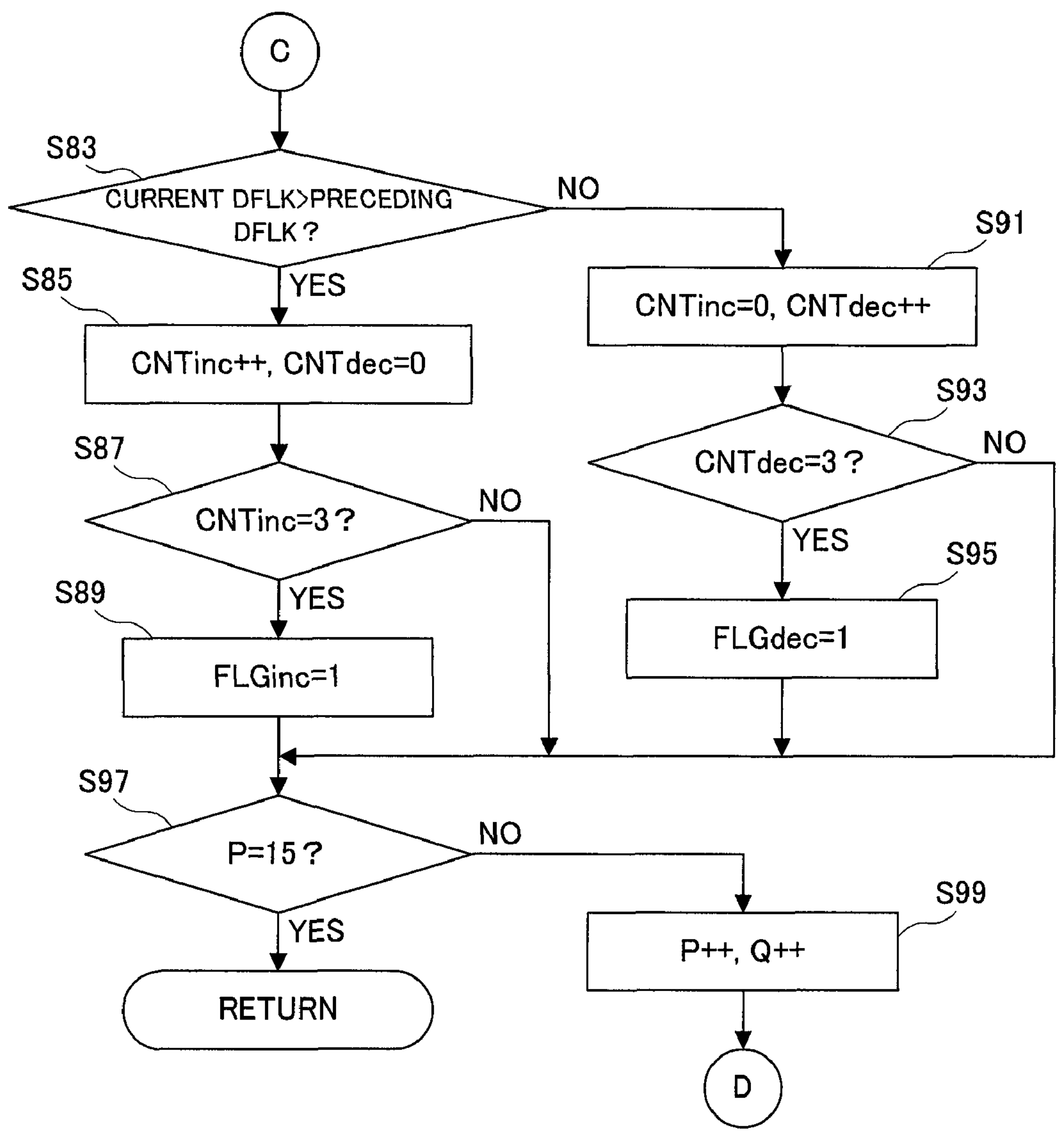
FIG. 16 is a flowchart showing still another portion of the operation of the CPU applied to the embodiment in FIG. 1.

The process in the step S59 shown in FIG. 14 is executed according to a subroutine shown in FIGS. 15 and 16. Firstly, in a step S71, each of variables CNTinc and CNTdec is set to "0", in a step S73, each of the flags FLGinc and FLGdec is set to "0", and in a step S75, variables P and Q are set to "1" and "0", respectively.

In a step S77, the difference value DFLK equivalent to a difference between the difference value ΔFLK_P written in the column C_P and the difference value ΔFLK_Q written in the column C_Q is calculated. In a step S79, it is determined whether or not the variable P is equal to or more than "2". When NO is determined, the variables P and Q are incremented in a step S81, and then, the process returns to the step S77 while YES is determined, the process advances to a step S83. In the step S83, it is determined whether or not the difference value DFLK calculated this time in the step S77 is larger than the difference value DFLK calculated last time in the step S77.

When YES is determined in the step S83, the process advances to a step S85 in which the variable CNTinc is incremented, and at the same time, the variable CNTdec is set to "0". In a step S87, it is determined whether or not the variable CNTinc reaches "3", and when NO is determined, the process directly advances to a step S97 while when YES is determined, the process sets the flag FLGinc to "1" in a step S89, and then, advances to the step S97.

When NO is determined in the step S83, the process advances to a step S91 in which the variable CNTinc is set to "0" and the variable CNTdec is incremented. In a step S93, it is determined whether or not the variable CNTdec reaches "3", and when NO is determined, the process directly advances to the step S97 while YES is determined, the process sets the flag FLGdec to "1" in a step S95, and then, advances to the step S97.

In the step S97, it is determined whether or not the variable P reaches "15". When NO is determined in this step, the process increments the variables P and Q in a step S99, and then, returns to the step S77 while YES is determined, the process returns back to the routine at a hierarchically upper level.

As is seen from the above description, the image sensor 16 repeatedly outputs the object scene image produced on the imaging surface having 1080 pixels lined up in a vertical direction (predetermined direction). The driver 18 repeatedly executes the exposing operation for exposing the imaging surface for each pixel lined up in a vertical direction. The CPU 30 repeatedly detects a plurality of luminance values respectively corresponding to the plurality of flicker evaluation areas FEV_0 to FEV_15 allocated to the imaging surface in a manner to be located at positions different from one another in a vertical direction, based on the object scene image outputted from the image sensor 16 (S35 to S47). Moreover, the CPU 30 determines the presence or absence of the flicker based on the plurality of luminance values thus detected (S49 to S65).

Thus, the imaging surface has a plurality of pixels lined up in a vertical direction, and is exposed for each portion of pixels in a vertical direction. Moreover, the plurality of flicker evaluation areas FEV_0 to FEV_15 are allocated to the imaging surface in a manner to be located at positions different from one another in a vertical direction. Herein, the vertical direction is equivalent to a direction which intersects a flicker streak appearing in the object scene image outputted from the image sensor 16.

Therefore, when a repetitive blinking manner of the light source differs from a repetitive manner of the exposing operation, the plurality of luminance values respectively corresponding to the plurality of flicker evaluation areas FEV_0 to FEV_15 fluctuate corresponding to this difference. Upon determining the presence or absence of the flicker, such a plurality of luminance values are noticed. Thereby, the accuracy for determining the flicker is improved.

Figure 17:
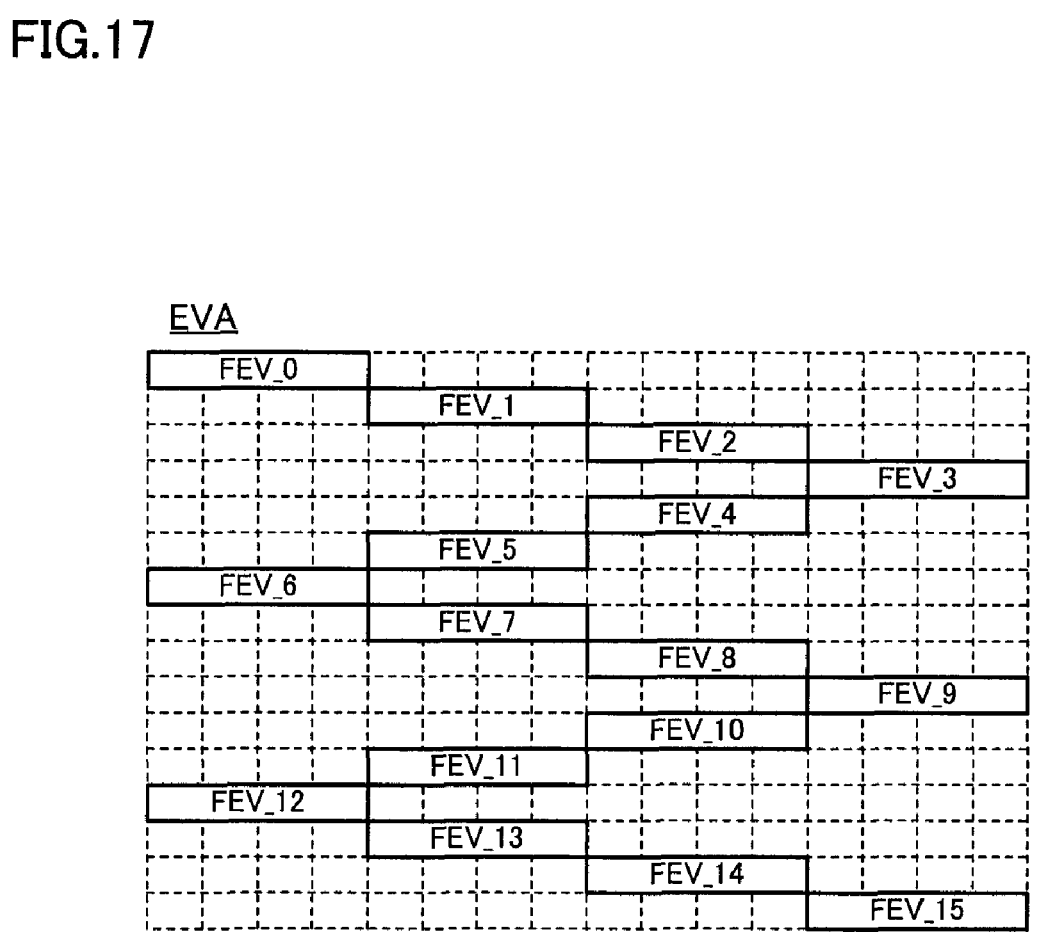

It is noted that in this embodiment, horizontal positions of the flicker evaluation areas FEV_0 to FEV_15 are matched one another, as shown in FIG. 4; however, the horizontal positions of the flicker evaluation areas FEV_0 to FEV_15 may be optionally offset to one another, as shown in FIG. 17.

Moreover, in this embodiment, by using a so-called focal-plane electronic shutter system, the imaging surface is exposed for each pixel in a vertical direction; however, the imaging surface may be optionally exposed in a vertical direction for each plurality of pixels that falls below the number of vertical pixels of the imaging surface.

Furthermore, in this embodiment, the AE/AWB evaluation value is created based on the simple RGB data; however, an AE evaluation value may be created based on the simple Y data while an AWB evaluation value may be created based on the simple RGB data.

Also, in this embodiment, the focus lens 12 is moved in an optical-axis direction in order to adjust the focus. However, instead of the focus lens 12 or together with the focus lens 12, the imaging surface may be moved in the optical-axis direction.

Moreover, in this embodiment, a video camera for recording a moving image is assumed. However, the present invention may also be applied to a still camera for recording a still image. The problem of the flicker within one frame, which is described with reference to FIG. 8(A) to FIG. 8(C) and FIG. 9(A) to FIG. 9(C), becomes conspicuous when a still image is recorded. According to the present invention, it is possible to precisely dissolve such a flicker occurring within one frame, and thus, the present invention is also suitable for the still camera for recording a still image.

Furthermore, in this embodiment, the raw image data produced by the image sensor 16 is divided into four fields in a vertical direction, and the four fields of divided raw image data are outputted respectively from the channels CH1 to CH4; however, the outputting direction is not limited thereto as long as the raw image data are read out from the image sensor 16 at a frame rate of 30 fps.

Moreover, in this embodiment, as an initial operation under the AE/AWB task, the exposure time period is adjusted to a time period that is an integral multiple of 1/120 seconds and the aperture amount is adjusted to an amount that defines the appropriate EV value by working in cooperation with such an exposure time period, under the assumption that the object scene is not influenced by the light source that blinks in a cycle equivalent to 50 Hz. However, instead of such an initial operation, the following may be possible: the exposure time period and the aperture amount are firstly adjusted according to a program chart without regard to the flicker, and when the flicker is detected, the exposure time period and the aperture amount are modified so that this flicker is dissolved.

Also, in this embodiment, the raw image data is outputted from the image sensor 16 at a frame rate of 30 fps. However, the frame rate of the raw image data may be 50 fps, 60 fps, etc., rather than 30 fps.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:

an imager which repeatedly outputs an object scene image produced on an imaging surface having M (M: an integer of at least two) pixels lined up in a predetermined direction;

an exposer which repeatedly executes an exposing operation for exposing said imaging surface for each N (N: an integer of at least one and less than M) pixels lined up in said predetermined direction;

a detector which repeatedly detects a plurality of luminance values respectively corresponding to a plurality of flicker evaluation areas allocated to said imaging surface in a manner to be located at positions different from one another in said predetermined direction, based on the object scene image outputted from said imager; and a determiner which determines presence or absence of a flicker based on the plurality of luminance values repeatedly detected by said detector, wherein said determiner includes:

a selector which selects each of said plurality of luminance values along said predetermined direction;

a first measurer which measures the number of times with which a luminance selected this time by said selector exceeds a luminance selected last time by said selector; and a second measurer which measures the number of times with which the luminance selected this time by said selector is equal to or less than the luminance selected last time by said selector.

2. A video camera, comprising:

an imager which repeatedly outputs an electronic image produced on an imaging surface having M (M: an integer of at least two) pixels lined up in a predetermined direction;

an exposer which repeatedly executes an exposing operation for exposing said imaging surface for each N (N: an integer of at least one and less than M) pixels lined up in said predetermined direction;

a detector which repeatedly detects a plurality of luminance values respectively corresponding to a plurality of flicker evaluation areas allocated to said imaging surface in a manner to be located at positions different from one another in said predetermined direction, based on the electronic image outputted from said imager;

a calculator which calculates a plurality of luminance change amounts in a time axis direction respectively corresponding to said plurality of flicker evaluation areas, based on a detection result of said detector; and an expresser which expresses occurrence of a flicker when the plurality of luminance change amounts calculated by said calculator indicate both of a partial increasing tendency and a partial decreasing tendency in said predetermined direction.

3. A video camera according to claim 2, wherein said imager outputs the electronic image for each first period, and said exposer exposes the M pixels lined up in said predetermined direction in a second period shorter than said first period.

4. A video camera according to claim 2, wherein said predetermined direction is equivalent to a direction which intersects a flicker streak appearing in the electronic image outputted from said imager.

5. A video camera according to claim 2, further comprising an adjuster which adjusts an exposure time period of said imaging surface by referring to a process of said expresser.

6. A video camera according to claim 2, wherein said expresser includes:

a selector which selects each of the plurality of luminance change amounts along said predetermined direction;

a first measurer which measures the number of times with which a luminance change amount selected this time by said selector exceeds a luminance change amount selected last time by said selector; and a second measurer which measures the number of times with which the luminance change amount selected this time by said selector is equal to or less than the luminance change amount selected last time by said selector.

7. A video camera according to claim 2, wherein said plurality of flicker evaluation areas have the same shape and size as one another.

8. A computer program embodied on a non-transitory computer-readable medium in order to control a video camera provided with an imager which repeatedly outputs an electronic image produced on an imaging surface having M (M: an integer of at least two) pixels lined up in a predetermined direction, and an exposer which repeatedly executes an exposing operation for exposing said imaging surface for each N (N: an integer of at least one and less than M) pixels lined up in said predetermined direction, said program causing said video camera to perform the steps, comprising:

a detecting step of repeatedly detecting a plurality of luminance values respectively corresponding to a plurality of flicker evaluation areas allocated to said imaging surface in a manner to be located at positions different from one another in said predetermined direction, based on the electronic image outputted from said imager;

a calculating step of calculating a plurality of luminance change amounts in a time axis direction respectively corresponding to said plurality of flicker evaluation areas, based on a detection result of said detecting step; and an expressing step of expressing occurrence of a flicker when the plurality of luminance change amounts calculated by said calculating step indicate both of a partial increasing tendency and a partial decreasing tendency in said predetermined direction.

* * * * *